US009869223B2

(12) United States Patent
Gonze et al.

(10) Patent No.: US 9,869,223 B2
(45) Date of Patent: Jan. 16, 2018

(54) FLEXIBLE ENGINE METAL WARMING SYSTEM AND METHOD FOR AN INTERNAL COMBUSTION ENGINE

(71) Applicant: GM Global Technology Operations LLC, Detroit, MI (US)

(72) Inventors: Eugene V. Gonze, Pinckney, MI (US); Vijay Ramappan, Novi, MI (US); Michael J. Paratore, Jr., Howell, MI (US); Yue-Ming Chen, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 352 days.

(21) Appl. No.: 14/466,289

(22) Filed: Aug. 22, 2014

(65) Prior Publication Data

US 2016/0053646 A1    Feb. 25, 2016

(51) Int. Cl.
*F01N 3/04* (2006.01)
*F01N 9/00* (2006.01)
*F01P 7/16* (2006.01)
*F01N 13/10* (2010.01)

(52) U.S. Cl.
CPC ............ *F01N 3/046* (2013.01); *F01N 9/00* (2013.01); *F01N 13/105* (2013.01); *F01P 7/16* (2013.01); *F01N 2260/024* (2013.01); *F01N 2900/0408* (2013.01); *F01N 2900/08* (2013.01); *F01N 2900/1631* (2013.01); *Y02T 10/20* (2013.01); *Y02T 10/47* (2013.01)

(58) Field of Classification Search
CPC .......... F01N 3/046; F01N 13/105; F01N 9/00; F01N 2260/024; F01N 2900/08; F01N 2900/0408; F01N 2900/1631; F01P 7/16; Y02T 10/47

See application file for complete search history.

(56) References Cited

U.S. PATENT DOCUMENTS 6,843,211 B2 * 1/2005 Iwasaki .................... B60H 1/02
123/41.31
8,408,168 B2 * 4/2013 Suzuki .................... F01P 7/164
123/41.02

(Continued)

FOREIGN PATENT DOCUMENTS

CN        1024829 C    6/1994
JP     2012-7523 A    1/2012

(Continued)

*Primary Examiner* — David Hamaoui

(57) ABSTRACT

A method is disclosed for optimizing fuel economy during an engine warm up phase of operation of an internal combustion engine. An exhaust manifold may have a coolant jacket through which a coolant may flow. A temperature of the coolant in the exhaust manifold may be determined to detect when it is at a predetermined maximum threshold, which represents a temperature threshold just below a temperature at which the coolant will begin to boil. When this threshold is reached, then a determination may be made as to a minimum rate of flow of the coolant through the exhaust manifold which maintains the coolant at about the predetermined maximum threshold, and the coolant may be flowed through the exhaust manifold at the determined minimum rate of flow.

15 Claims, 3 Drawing Sheets

(56) References Cited

U.S. PATENT DOCUMENTS

| | | | | |
|---|---|---|---|---|
| 8,555,661 | B2 * | 10/2013 | Markowitz | B60H 1/3205 |
| | | | | 62/126 |
| 8,997,470 | B2 * | 4/2015 | Yoshioka | F01N 3/2853 |
| | | | | 60/298 |
| 9,004,021 | B2 * | 4/2015 | Adam | F01N 3/046 |
| | | | | 123/41.72 |
| 9,334,783 | B2 * | 5/2016 | Pursifull | F01N 5/02 |
| 2011/0120394 | A1 * | 5/2011 | Onozawa | F01P 7/162 |
| | | | | 123/41.1 |
| 2016/0047293 | A1 * | 2/2016 | Gonze | F01P 5/10 |
| | | | | 123/41.02 |
| 2016/0053665 | A1 * | 2/2016 | Gonze | F01P 7/167 |
| | | | | 123/41.08 |

FOREIGN PATENT DOCUMENTS

| | | | | |
|---|---|---|---|---|
| WO | WO 2011114453 A1 * | 9/2011 | | F01N 3/2853 |
| WO | WO 2011157417 A1 * | 12/2011 | | F01N 3/046 |

\* cited by examiner

FLEXIBLE ENGINE METAL WARMING SYSTEM AND METHOD FOR AN INTERNAL COMBUSTION ENGINE

FIELD

The present disclosure generally relates to cooling systems for internal combustion engines, and more particularly to a system and method for controlling a coolant during a warm-up period of an internal combustion engine to avoid coolant boiling, but still promote rapid warm-up of the engine to its normal operating temperature.

BACKGROUND

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. A coolant is circulated through the engine block and the cylinder head(s) of the engine, and the cooling is maintained at an approximate predetermined temperature during normal operation. This enables the engine to operate at a predetermined operating temperature which maximizes efficiency, and thus the fuel economy of the engine.

During a start-up of the engine when the engine is cold, it is important, particularly for optimizing fuel economy, to have the engine reach its normal operating as quickly as possible. This promotes more efficient combustion and, importantly, reduces fuel consumption during engine warm up. However, it is not possible to simply provide zero coolant flow for the entire engine during the warm up phase. This is because the various parts of a modern internal combustion engine do not heat up perfectly uniformly during engine warm up. It has been determined that with modern turbocharged internal combustion engines, a component known as the integrated exhaust manifold (IEM), which flows exhaust gasses into the turbocharger, is typically the component that warms most rapidly during engine warm up from a cold start. So very shortly after initial startup, at least some small degree of coolant flow will need to be circulated through the IEM to prevent boiling of the coolant within the coolant jacket of the IEM. Preventing coolant boiling is important because coolant boiling will stress the metal of the IEM. However, simply flowing coolant through all parts of the engine in a relatively uniform flow will serve to pull heat out of the metal components making up the combustion chamber area, and more specifically from the cylinder head and the engine block proximate to the combustion chamber, and thus serve to lengthen the time that it takes the engine to reach its normal operating temperature. This also results in a reduction in fuel economy during the warm up phase.

The challenge is therefore how to manage the flow of coolant through select parts of the engine in a manner that prevents coolant boiling in those areas of the engine that typically heat up most rapidly, but which still does not pull heat out of the metal components of the engine in proximity to the combustion chambers of the engine. Addressing this challenge will enable improved fuel economy to be achieved during the warm up phase of the engine.

SUMMARY

In one aspect the present disclosure relates to a method for optimizing fuel economy during an engine warm up phase of operation of an internal combustion engine. The method may comprise providing an exhaust manifold having a coolant jacket through which a coolant may flow, and determining a temperature of the coolant in the exhaust manifold. The method may then operate to determine if the temperature of the coolant in the exhaust manifold is at a predetermined maximum threshold, the predetermined maximum threshold representing a temperature threshold just below a temperature at which the coolant will begin to boil. When the temperature of the coolant in the exhaust manifold is determined to have reached the predetermined maximum threshold during the engine warm up phase, then a determination may be made as to a minimum rate of flow of the coolant through the exhaust manifold to maintain the temperature of the coolant at about the predetermined maximum threshold. A flow of the coolant through the exhaust manifold may then be implemented in accordance with the minimum rate of flow.

In another aspect the present disclosure relates to a method for optimizing fuel economy during an engine warm up phase of operation of an internal combustion engine after a cold start. The method may comprise monitoring a temperature of coolant present in an integrated exhaust manifold (IEM) associated with the engine while the engine is in the warm up phase of operation. A determination may then be made as to when the temperature of the coolant in the IEM reaches a point where coolant boiling is almost about to begin. When it is determined that the coolant in the IEM is almost about to begin boiling, then a predetermined, limited flow of coolant may be caused to occur through the IEM to prevent an onset of coolant boiling.

In still another aspect the present disclosure relates to a system for optimizing fuel economy during an engine warm up phase of operation of an internal combustion engine. The system may comprise an exhaust manifold and a coolant which is flowable through the exhaust manifold. A coolant pump may be included for pumping fluid through the exhaust manifold. A temperature sensor may be used for determining a temperature of a portion of the coolant residing in the exhaust manifold during the engine warm up phase. An engine control module may be in communication with the temperature sensor and the coolant pump, and may be configured to determine when a temperature of the coolant residing in the exhaust manifold is about to reach a boiling point. The engine control module may further control the coolant pump to cause a minimum predetermined rate of flow to be applied to the coolant through the exhaust manifold. The predetermined minimum rate of flow may be sufficient to maintain the temperature of the coolant just below a boiling point.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
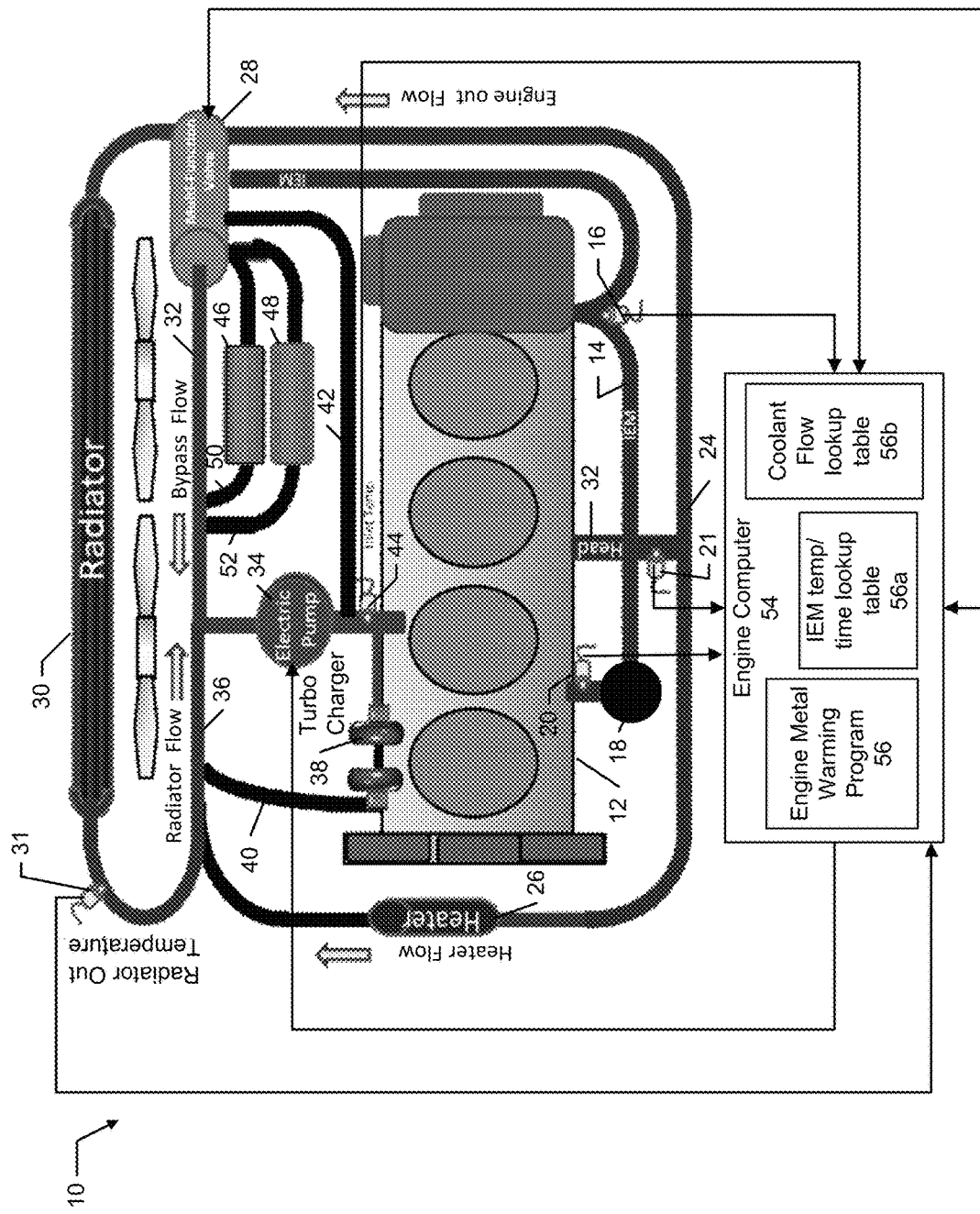
FIG. 1 is a functional block diagram of an example engine system according to the principles of the present disclosure, where the engine system incorporates a turbocharger that receives exhaust flow from an integrated exhaust manifold (IEM)

Referring now to FIG. 1, a high level diagram of an engine system 10 is shown in accordance with one example of the present disclosure to help illustrate a flow of engine coolant through the various parts of the engine system 10. The engine system 10 may include an engine block 12 which is in communication with an integrated exhaust manifold ("IEM") 14 having an IEM coolant temperature sensor 16. The engine block 12 is also in communication with a block valve 18 and a block temperature sensor 20 which senses the temperature of the coolant as it exits the engine block 12. An engine out coolant temperature sensor 21 senses the coolant temperature as the coolant exits the cylinder head (not explicitly shown in the figure).

A portion 22 of the coolant flow from the cylinder head may be directed into coolant circuit portion 24. Coolant circuit portion 24 may supply hot coolant to a heater 26 as well as to a multi-function valve 28. Multi-function valve 28 is in communication with a radiator 30 which receives hot coolant and cools the coolant. Bypass circuit 32 may supply a bypass flow of the coolant back to an electric coolant pump 34. Circuit portion 36 may also supply coolant which has exited the radiator 30, to the electric coolant pump 34. The temperature of the coolant as it exits the radiator 30 may be sensed by a radiator out temperature sensor 31. The coolant may be flowed towards and through a turbocharger 38 and channeled back to coolant circuit portion 36. Coolant circuit portion 42 may channel coolant back into the multifunction valve 28. An inlet temperature sensor 44 may sense the temperature of the coolant as it enters the turbocharger 38 and the engine block 12. Oil heat exchanger 46 and transmission heat exchanger 48 may each be in communication with coolant circuit portions 50 and 52 and with the multi-function valve 28, and may operate to help conduct heat from the coolant to the engine oil and the transmission fluid.

The system 10 may also include an engine computer 54 having an engine metal warming program 56 running thereon. The engine metal warming program 56 may be configured to access an IEM temperature/engine power lookup table 56a which includes information on estimated IEM coolant temperatures for a first predetermined time interval immediately after the engine system 10 is started. In this regard it will be appreciated that during the first 30-60 seconds after the engine system 10 is started from a cold condition, the readings from the IEM sensor 16 may not provide the needed level of accuracy of the coolant temperature, by itself, to gauge the temperature of the coolant in the IEM 14. This is because the IEM coolant temperature sensor 16 operates optimally when at least some small degree of coolant is flowing over its sensing element. But during the first predetermined time interval, no coolant will be flowing in the IEM 14. So for the first predetermined time interval immediately after the engine is started from a cold condition, the IEM temperature/engine power table 56a may be used to estimate the temperature of the coolant in the IEM 14. The estimates compiled in the IEM temperature/engine power lookup table 56a may be generated through empirical testing and known characteristics of the specific IEM 14, the specific type of engine coolant being used, air per cylinder and/or torque, and engine RPM, and any other pertinent factors that affect how quickly the coolant in the IEM 14 warms up to the boiling point during the first predetermined time interval during which no coolant is flowing through the IEM 14.

The engine computer 54 may receive inputs from each of the temperature sensors 16, 20, 21, 31 and 44, as well as communicate with the various components of the engine system 10 such as the heater 26, the electric pump 34, the block valve 18, and the multifunction valve 28. Communicating with these components enables the engine computer 54 to monitor and control operation of the various components and subsystems of the engine system 10.

The engine metal warming program 56 is used by the engine computer 54 to estimate the temperature of the coolant flowing in the IEM 14 by way of the temperature/engine power lookup table 56a and the temperature signals provided by the IEM temperature sensor 16. It is believed that the IEM 14 may be one of the hottest locations, if not the single hottest location, that the coolant experiences as it flows through the various portions of the engine system 10. Because of this, the coolant residing in the coolant jacket of the IEM 16 can be expected to reach a boiling temperature much quicker than the coolant residing in other portions of the engine system 10. The present disclosure makes use of this realization by using the engine metal warming program 56 and the engine computer 54 to cause just enough coolant flow to be moved through the IEM 16 to prevent coolant boiling, without causing coolant flow to be moved through other portions of the engine system 10, for example through the engine block 12 or the cylinder head(s). In this manner virtually no heat is removed from the metal associated with these portions of the engine system 10 by the coolant during engine warm up. Maintaining metal warming in the engine block 12 and the cylinder head(s) during the engine warm up phase of operation can significantly improve fuel economy during this phase of engine operation.

Figure 2:
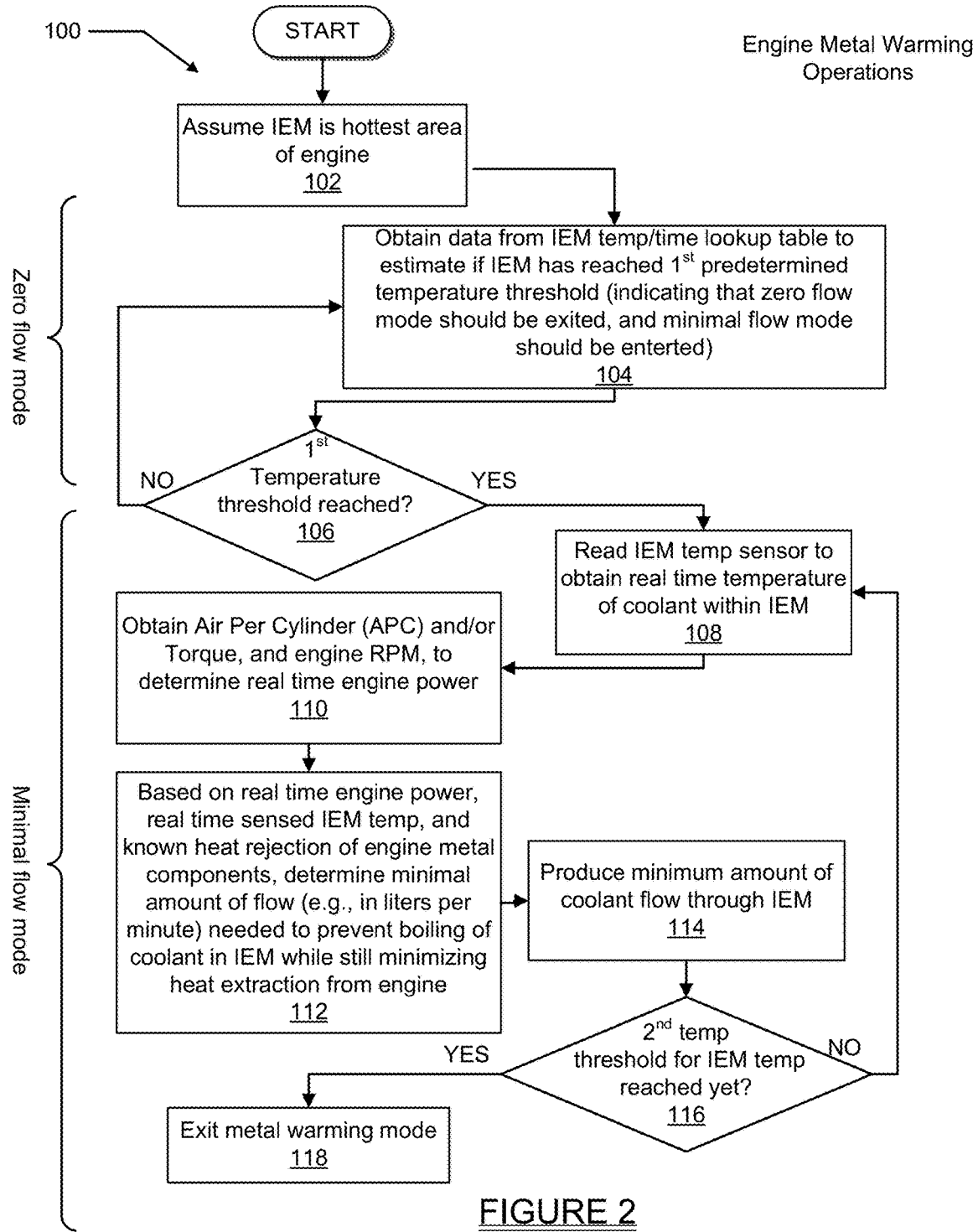
FIG. 2 is a flowchart illustrating one example of a plurality of operations that may be performed in implementing an engine metal warming method in accordance with the present disclosure.

Referring to FIG. 2, a high level flowchart 100 is shown which sets forth one example of various operations that may be performed by the engine computer 54 in implementing the engine metal warming program 56 to control coolant flow through the IEM 14, to achieve the desired engine metal warming without causing coolant boiling in the IEM. At operation 102 an assumption is initially made that the IEM 14 will form the hottest area of the engine system 10. At operation 104 the engine metal warming program 56 may use the temperature/engine power lookup table 56a during the first predetermined time interval to estimate if the IEM 14 has reached a first predetermined temperature threshold. As noted above, the first predetermined time interval defines a "zero flow" mode. The zero flow mode is thus the time interval between when the engine system 10 is initially started and when the IEM 14 reaches the first predetermined temperature threshold. During the zero flow mode no coolant flow occurs through the IEM 14, although coolant will of course be present in the jacket of the IEM 14. The object is to allow the metal components of the engine to warm as rapidly as possible without causing the coolant in the IEM 14 to begin to boil. In other words, an important objective is to not remove any heat from the metal components of the engine system 10 (e.g., block 12 and cylinder head(s)) so that the engine system 10 will be able to warm up to its nominal operating temperature as quickly as possible.

At operation 106 a check is made if the first predetermined temperature threshold has been reached. This check may be made by the engine computer 54 using the engine metal warming program 56 to read the IEM temperature/engine power table 56a. If this check produces a "No" answer, then operation 104 is repeated.

When the check at operation 106 indicates that the first temperature threshold has been reached, then at operation 108 the IEM temperature sensor 16 may be read by the engine computer 54 to obtain the real time temperature of the coolant within the IEM 14. At operation 110 the real time air flow per cylinder ("APC") through the cylinders of the engine block 12, and/or real time engine torque (f(torque)) produced by the engine system 10, and the real time engine RPM, may all be obtained by the engine computer 54, to determine the real time engine power, from which the real time heat rejection may be obtained. Operation 110 may further involve determining a plurality of real time variables such as real time coolant pressure (i.e., f(coolant energy)) and the IEM coolant temperature. The engine heat rejection represents a known parameter associated with the ability of the metal components of the engine system 10, notably the engine block 12 and the cylinder head(s), to reject heat. At operation 112, based on the real time engine power, real time sensed IEM temperature and known heat rejection for the engine metal components (i.e., IEM 14, cylinder head(s) and or block 12), as well as the real time pressure of the coolant, the engine computer 54 may determine the minimal amount of coolant flow (e.g., in liters per minute) needed to prevent the onset of coolant boiling in the IEM 14, while still minimizing heat extraction from the IEM. The minimal amount of coolant flow may be obtained from a coolant flow lookup table 56b, as shown in FIG. 1. The coolant flow lookup table 56b may include specific values for the needed minimum coolant flow through the IEM 14 to prevent the onset of coolant boiling in the IEM, for a sensed IEM coolant temperature and a determined heat rejection. The coolant flow lookup table 56b may be constructed using empirical testing data and known factors pertaining to a specific IEM and specific coolant. Again, the needed minimum IEM coolant flow is that minimum amount of coolant flow through the IEM 14 which just prevents the onset of coolant boiling in the IEM 14. At operation 114, flowing of the coolant at the determined minimal flow rate through the IEM 14 may be initiated.

At operation 116 a check is made to determine if one or more second temperature thresholds have been reached, which would indicate engine boiling at any other area of the engine system 10 or that the engine has reached its operating temperature. If not, then operations 108-114 are repeated. If any one of the one or more second predetermined temperature thresholds has been reached, then the engine metal warming mode is exited at operation 118.

Figure 3:
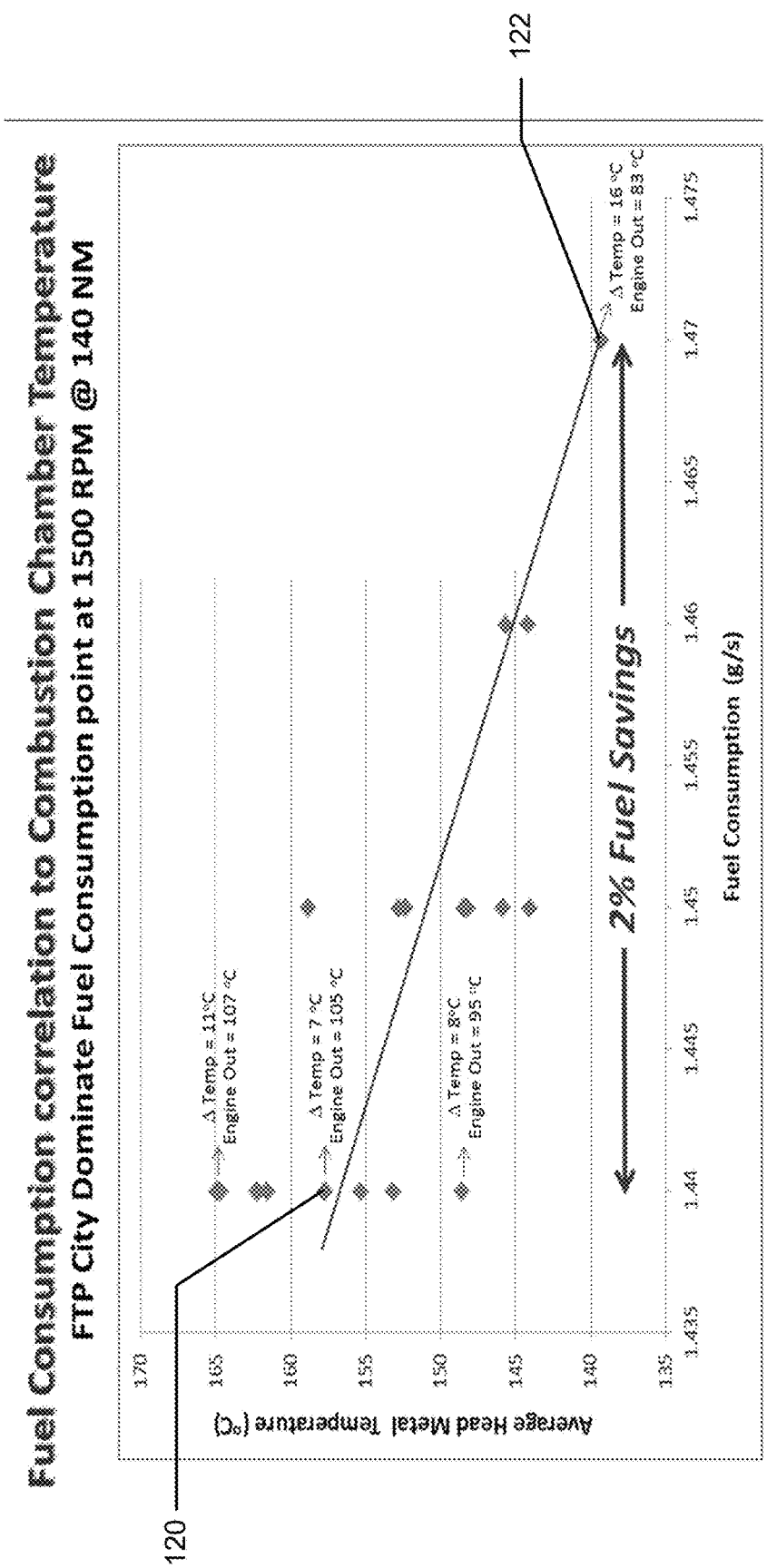
FIG. 3 shows a graph illustrating how elevating average cylinder head metal temperature and coolant temperature during the engine warm up phase can reduce the fuel consumption during the warm up phase by up to at least about two percent.

With brief reference to FIG. 3, testing of fuel consumption during the startup phase of operation of a present day internal combustion engine has indicated that fuel savings of potentially 2%, or possibly even more, may be realized using the system 10 and method of the present disclosure. FIG. 3 illustrates how changes in temperature to cylinder head metal during the engine warm up phase of operation can produce a significant fuel savings. Again, both coolant temperature and flow rate are being considered to optimize the engine metal warming taking place. In FIG. 3, point 120 represents a rate of fuel consumed (1.44 grams per second) when the average cylinder head metal temperature is about 157.5° C. (i.e., with the engine warming methodology of the present disclosure being applied). Point 122 represents the instantaneous rate of fuel consumption (1.47 grams per second) when the average head metal temperature is about 137.5° C. By controlling heat rejection in the IEM 14, the engine metal warming described herein is able to produce a tangible increase in fuel efficiency during the engine warm up phase. This fuel savings is expected to be an important factor in helping to meet increasingly stringent U.S. Government fuel economy standards for cars and light trucks.

The systems and methods disclosed herein enable preventing coolant flow to the combustion chamber areas of the engine, to promote rapid warming of the metal of the engine combustion chamber components (e.g., block and cylinder heads) to the engine's optimal operating temperature, while preventing coolant boiling from occurring in the IEM 14. This enables thermal energy to be preserved in the metal components of the engine during the engine warm up phase of operation, rather than having the thermal energy transferred into the coolant during the engine warm up phase. This enables the engine system 10 to reach its optimal operating temperature as quickly as possible while reducing or eliminating the stresses to the metal in the IEM 14 that would occur if no coolant flow at all was provided during the engine warm up phase, causing coolant boiling to occur. This also enables a significant improvement in fuel economy during the engine warm up phase. Estimates of improved fuel economy potentially on the order of 1.5%-2%, or possibly higher, may potentially be achievable during the engine warm up phase of operation by employing the teachings described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A method for optimizing fuel economy during an engine warm up phase of operation of an internal combustion engine, the method comprising:
    preventing coolant flows through an exhaust manifold, an engine block portion of an engine, and a cylinder head portion of an engine;
    while coolant flow through the exhaust manifold, the engine block portion of the engine, and the cylinder head portion of the engine is prevented, determining an estimated temperature of the coolant in the exhaust manifold independently of measurements from a coolant temperature sensor that measures a temperature of coolant within the exhaust manifold;
    while coolant flow through the exhaust manifold, the engine block portion of the engine, and the cylinder head portion of the engine is prevented, determining whether the estimated temperature of the coolant present in the exhaust manifold has reached a predetermined maximum threshold, the predetermined maximum threshold being less than a temperature at which the coolant will begin to boil;
    when the estimated temperature of the coolant in the exhaust manifold is determined to have reached the predetermined maximum threshold, based on the temperature of coolant within the exhaust manifold measured by the coolant temperature sensor, determining a minimum rate of flow of the coolant through the exhaust manifold to maintain the temperature of the coolant at about the predetermined maximum threshold; and
    causing a flow of the coolant through the exhaust manifold in accordance with the minimum rate of flow while continuing to prevent coolant flow through the engine block portion of the engine and the cylinder head portion of the engine.

2. The method of claim 1, wherein determining the minimum rate of flow comprises determining the minimum rate of flow of the coolant through the exhaust manifold based at least in part on an engine heat rejection value which is determined at least in part from measurements relating to air per cylinder (APC) and engine speed in revolutions per minute (RPM).

3. The method of claim 2, wherein the engine heat rejection value is determined at least in part from measurements relating to engine torque and the engine RPM.

4. The method of claim 2, wherein the engine heat rejection value is determined from measurements relating to each of APC, engine torque, and the engine RPM.

5. The method of claim 1, wherein determining the minimum rate of flow comprises determining the minimum rate of flow of the coolant through the exhaust manifold at least in part on the estimated temperature of the coolant in the exhaust manifold.

6. The method of claim 1, wherein determining the minimum rate of flow comprises determining the minimum rate of flow of the coolant through the exhaust manifold based on a combination of pressure of the coolant and a predetermined engine heat rejection factor, the predetermined engine heat rejection factor including a predetermined value of air per cylinder (APC) during the engine warm up phase, an engine torque during the engine warm up phase, and an engine speed in revolutions per minute (RPM) during the engine warm up phase.

7. The method of claim 1, wherein said exhaust manifold comprises an integrated exhaust manifold.

8. A system for optimizing fuel economy during an engine warm up phase of operation of an internal combustion engine, the system comprising:
    an exhaust manifold;
    a coolant pump that pumps coolant through the exhaust manifold;
    a temperature sensor that measures a temperature of coolant within the exhaust manifold;
    an engine control module that:
        prevents coolant flow through the exhaust manifold, an engine block portion of an engine, and a cylinder head portion of an engine;
        while coolant flow through the exhaust manifold, the engine block portion of the engine, and the cylinder head portion of the engine is prevented, determines an estimated temperature of the coolant in the exhaust manifold independently of the temperature of coolant measured by the temperature sensor;
        while coolant flow through the exhaust manifold, the engine block portion of the engine, and the cylinder head portion of the engine is prevented, determines whether the estimated temperature of the coolant within the exhaust manifold has reached a predetermined maximum threshold, wherein the predetermined maximum threshold is less than a temperature at which the coolant will begin to boil;
        when the estimated temperature of the coolant in the exhaust manifold has reached the predetermined maximum threshold, based on the temperature of the coolant measured by the temperature sensor, determines a minimum flow rate of the coolant through the exhaust manifold to maintain the temperature of the coolant at about the predetermined maximum threshold; and
        causes coolant flow through the exhaust manifold based on the minimum flow rate while continuing to prevent coolant flow through the engine block portion of the engine and the cylinder head portion of the engine.

9. The system of claim 8, wherein engine control module determines the minimum flow rate based on a combination of a pressure of the coolant during the engine warm up phase, a predetermined heat rejection of metal components of the engine, and a speed of the engine in revolutions per minute (RPM) during the engine warm up phase.

10. The system of claim 8, wherein the engine control module determines the minimum flow rate based at least in part on an engine heat rejection value which is determined at least in part from measurements relating to air per cylinder (APC) and an engine speed in revolutions per minute (RPM).

11. The system of claim 10, wherein the engine control module determines the engine heat rejection value based at least in part on measurements relating to engine torque and the engine RPM.

12. The system of claim 10, wherein the engine control module determines the engine heat rejection value based on measurements relating to each of APC, engine torque, and the engine RPM.

13. The system of claim 8, wherein the engine control module determines the minimum flow rate based at least in part on the estimated temperature of the coolant in the exhaust manifold.

14. The system of claim 8 wherein the engine control module determines the minimum flow rate based on a combination of pressure of the coolant and a predetermined engine heat rejection factor,
   wherein the predetermined engine heat rejection factor includes a predetermined value of air per cylinder (APC) during the engine warm up phase, an engine torque during the engine warm up phase, and an engine speed in revolutions per minute (RPM) during the engine warm up phase.

15. The system of claim 8, wherein said exhaust manifold comprises an integrated exhaust manifold.

\* \* \* \* \*